Aug. 3, 1965  R. E. GRAVES  3,199,037
PHASE-LOCKED LOOPS
Filed Sept. 25, 1962  3 Sheets-Sheet 1

ROSS E. GRAVES
INVENTOR.

BY
AGENT

Aug. 3, 1965  R. E. GRAVES  3,199,037
PHASE-LOCKED LOOPS
Filed Sept. 25, 1962  3 Sheets-Sheet 2

ROSS E. GRAVES
INVENTOR.

BY
AGENT

ROSS E. GRAVES
INVENTOR.

United States Patent Office 3,199,037
Patented Aug. 3, 1965

3,199,037
PHASE-LOCKED LOOPS
Ross E. Graves, Pacific Palisades, Calif., assignor, by mesne assignments, to Thompson Ramo Wooldridge Inc., Cleveland, Ohio, a corporation of Ohio
Filed Sept. 25, 1962, Ser. No. 226,117
12 Claims. (Cl. 328—155)

This invention relates generally to phase-locked loops and, more particularly, to improved techniques for reducing dynamic lag in narrow band phase-locked loops.

In certain radar systems, for example, those known as continuous wave Doppler systems, a moving target is identified as a frequency shift from the originally transmitted frequency signal. This frequency shift is called a Doppler shift and is analogous to the Doppler shift occurring in sound propagation. The range informational content of the received signal is determined by comparing the transmitted and received frequencies with the difference or beat frequency being a measure of movement of the target. Since a stationary target reflects basically the same frequency being transmitted, no Doppler shift is produced; whereas, a rapidly accelerating target will produce a substantial Doppler shift.

By measuring the phase of the received echo it is possible to obtain position information of the target. In the past, phase errors have caused great difficulty in the implementation of phase-locked loops due to the input-output phase stability required. Analysis indicates the phase errors in the output circuits are caused by dynamic tracking errors, commonly called dynamic lag, and phase detector and D.C. loop amplifier unbalance. The dynamic phase lag in a phase-locked loop is of little or no consequence when measuring velocity, since an essentially constant phase lag will have no effect on the Doppler frequency measurement. By contrast, dynamic phase lag is extremely significant when the function of the over-all system is to measure phase, which is position, rather than phase rate, which is velocity. In both phase and phase-rate measuring systems, the function of the phase-locked loop is usually to perform narrowband filtering in order to yield a high output signal-to-noise ratio, but the primary function of a phase-rate measuring system is to measure velocity; whereas, the primary function of a phase measuring system is to measure position. The two functions may be combined in a practical guidance or tracking system since certain portions of the system will be employed purely for rate measurement, while other portions will be employed for position measurement only. In the case of the position measuring system, the dynamic lag effects are believed caused by Doppler frequency shifts, rates of change of Doppler frequency shifts, rates of rates of change of Doppler frequency shifts, etc.

This invention is concerned with the implementation of techniques that compensate for the dynamic lag errors in such a way as to remove them effectively from the output data. An additional advantage obtained by the use of this invention is that commutation schemes for the removal of phase detector and D.C. loop amplifier unbalance may be used. Normally, commutation schemes are impractical because of the relatively high commutation rates which would usually be required to avoid introduction of transients into the output of the phase-locked loop. Commutation techniques are more fully described and claimed in copending application, entitled Precision Phase Detector, Serial No. 226,118, filed September 25, 1962 now Patent No. 3,142,804.

In this invention there is disclosed a first loop circuit responsive to a frequency varying input signal for generating an output signal having substantially the same instantaneous frequency as the input signal but differing in phase by the phase lag error caused by said first loop. A second loop circuit is made responsive to the same input signal and the first output signal for generating a second output signal having substantially the same phase as said input signal. Commutation techniques may be used in the second loop circuit to remove any phase detector and D.C. loop amplifier unbalance from the second output signal.

Further objects and advantages will be made more apparent as the description progresses. Reference is now made to the accompanying drawings herein:

Figure 1:
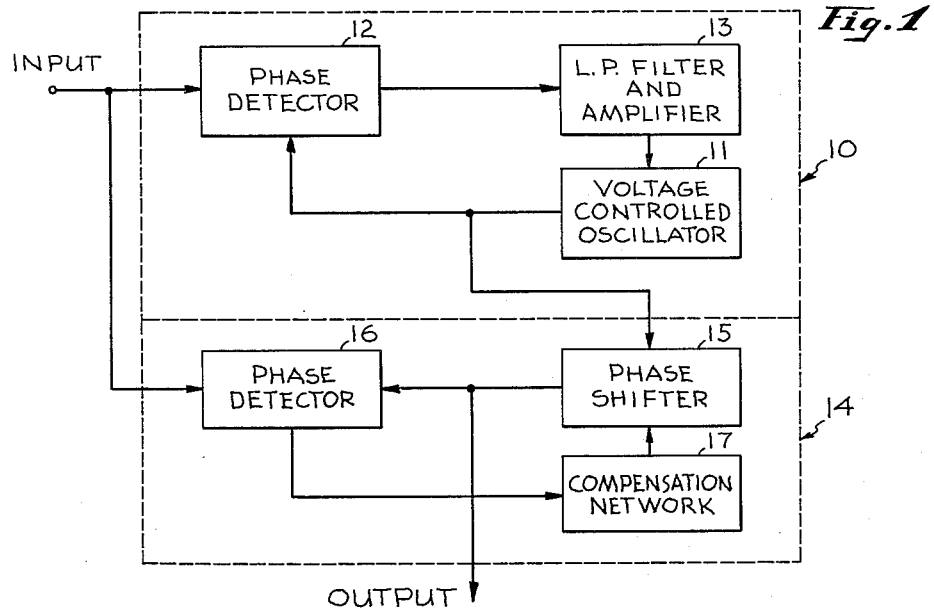
FIG. 1 is a block diagram illustrating a phase-stabilized, simple phase-locked loop.

Referring now to FIG. 1, there is shown an embodiment of the invention for phase stabilizing a phase-locked loop circuit. The dynamic phase lag of a phase-locked loop, which occurs when the loop is tracking a signal whose frequency is varying (for example, the signal from an accelerating vehicle) is relatively small and slowly changing. This error is generated as a result of the action of a first loop 10 which is a conventional phase-locked loop. Since it is well known that in a conventional phase-locked loop the output signal usually differs from the input by a 90 degree phase shift, in addition to any dynamic lag or other phase shift which may be present, all reference in the specification and claims to the output phase shift should be interpreted to include the inherent 90 degree phase shift. Since the 90 degree phase shift is a known shift, it causes no problem, in that the correction loop to be defined need only compensate for dynamic lag errors and not the referred to 90 degree shift. The first loop 10 compares the output phase of a voltage controlled oscillator 11 with the phase of a frequency varying input signal in a phase detector 12. The output from the phase detector 12 is smoothed in a low pass filter and amplifier 13 which is equivalent to a suitable compensation network. The filtered error signal is fed to the voltage controlled oscillator 11 which generates a signal having substantially the same frequency and phase as the input signal. The detected phase difference between the incoming frequency and the signal generated by the VCO 11 will, in general, be caused by the phase lag of the defined first loop 10.

A second loop 14 is a phase correction loop for locking the phase of the VCO output to the phase of the input signal. In order to insure that the phase correction effected by the second loop 14 does not interfere with the operation of the first phase-locked loop 10, the phase correction is introduced entirely external to the first loop. The signal from the VCO 11 is fed to a phase shifter 15, which feeds a phase detector 16 that is arranged to compare the phase of the input signal with the signal generated by the VCO 11. A phase difference between these two signals is detected and fed to a compensation network 17, which includes the necessary filtering and integrating circuits for controlling phase shifter 15 in such a manner that the VCO signal fed from the phase shifter 15 to the phase detector 16 will always be in phase with the input signal. The output of the phase detector 16 is therefore taken from the output of phase shifter 15, which carries the corrected VCO signal. The output for the combination of loop 10 and loop 14 is the output of the phase shifter 15.

Figure 2:
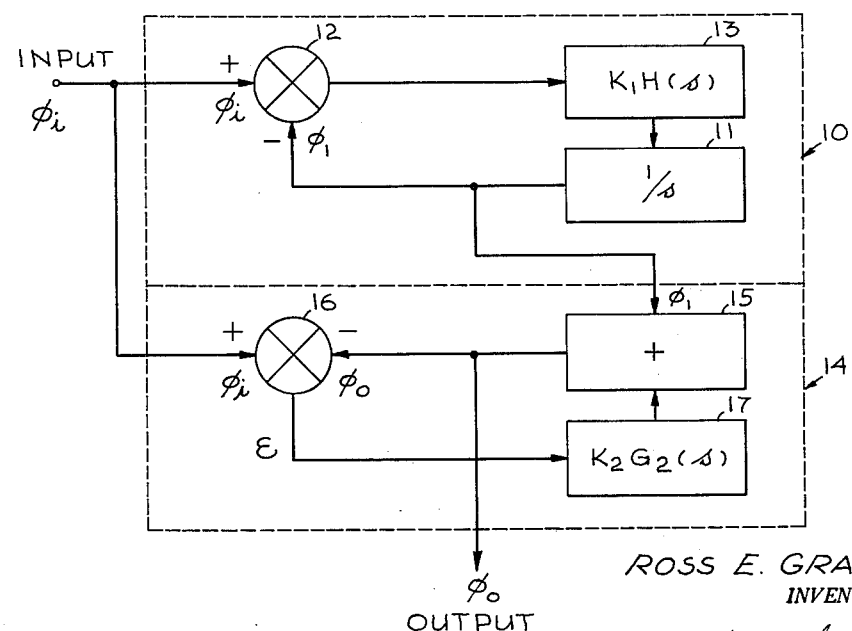
FIG. 2 is a block diagram illustrating the transfer functions of the circuit illustrated in FIG. 1.

The following analysis taken in connection with FIG. 2 will be phrased in terms of the simple phase-locked loop rather than in terms of, for example, its application to a phase-stable receiver or phase-stable hybrid tracking filter and digital data extraction unit. The modifications required to adapt the ideas presented to the various possible applications are straightforward and should cause no difficulty to one skilled in the art. In this explanation, operational notation is employed extensively to facilitate the analysis. In every case the phases of the input signal and the output of the VCO are understood to be the difference between the true input or output phases and the phase output of the free-running oscillator; that is, the actual phases are reduced by the output phase of the VCO when operating with zero control voltage. This convention is equivalent to referring all frequencies to the free-running frequency of the VCO 11. The advantage of the convention is that it permits the VCO to be represented as a perfect integrator.

In order to represent the action of the phase detector in a linear approximation as being simply the subtraction of the phases of the two input signals, we make the additional convention that the phase references for the input signal phase and the output phase of the VCO differ by 90 degrees. The purpose in introducing this convention is merely to account for the fact that the output of a phase detector is proportional to the cosine of the input phase difference, rather than to the sine of this phase difference. All phase detectors will be taken to have unit gain so that in terms of the input phases they act as simple differentials. Also, the gain in a phase-locked loop will be shown as lumped entirely in the compensation network for that loop, so that the sensitivity of the VCO is one cycle per second per volt of control signal. With the loop gain lumped into the compensation network in this way, the transfer function of the VCO may be represented simply as $1/s$. When phase shifters (which would normally be electronic phase-shift networks, but which could be electromechanical units) are shown, it will be convenient to suppose that they produce one radian of phase shift per volt of control signal and to account for the sensitivity of a physical phase shifter by lumping the appropriate sensitivity constant with the gain of the compensation network employed ahead of the phase shifter. This convention permits the phase shifter to be represented as a simple summing network.

Finally, the transfer characteristic of the compensation network which precedes the VCO will always be written merely as $K_1H(s)$, and the open loop transfer function of the phase-locked loop will be written as $K_1G_1(s)$ so that with the conventions introduced previously, we have:

$$K_1G_1(s) = K_1 \frac{H(s)}{s}$$

From FIG. 2 the following relationships will be made more apparent:

(1) $\quad \epsilon = \phi/_i - \phi_0$ (2) $\quad \phi_0 = \phi_1 + K_2G_2(s)\epsilon = \phi_1 + K_2G_2\phi_i - K_2G_2\phi_0$ (3) $\quad (1+K_2G_2)\phi_0 = \phi_1 + K_2G_2\phi_i$ Since (4) $\quad \phi_1 = \frac{K_1G_1}{1+K_1G_1}\phi_i$ this last result becomes (5) $\quad (1+K_2G_2)\phi_0 = \frac{K_1G_1}{1+K_1G_1}\phi_i + K_2G_2\phi_i$ $$= \frac{K_1G_1 + K_2G_2 + K_1K_2G_1G_2}{1+K_1G_1}\phi_i$$

whence (6) $\quad \phi_0 = \frac{K_1G_1 + K_2G_2 + K_1K_2G_1G_2}{(1+K_1G_1)(1+K_2G_2)}\phi_i$ and (7) $\quad \epsilon = \frac{1}{(1+K_1G_1)(1+K_2G_2)}\phi_i$ From the results of this analysis, it is apparent that the compensation method shown is equivalent to a simple servo loop with an open loop transfer function $KG(s)$ given by $$KG(s) = K_1G_1(s) + K_2G_2(s) + K_1K_2G_1(s)G_2(s)$$

and that the stability of the resulting compensation scheme is equivalent to that of two elementary servo loops with open loop transfer functions $K_1G_1(s)$ and $K_2G_2(s)$, respectively. Moreover, and of fundamental importance, is the fact that the resulting equivalent open loop transfer function contains the product $G_1(s)G_2(s)$, which implies that the over-all equivalent transfer function has a pole at the origin whose order is the sum of the orders of the poles at the origin for $G_1(s)$ and $G_2(s)$. This summation of the orders of the poles at the origin which occurs individually in $G_1$ and $G_2$ places high order zeros in the numerator of the closed loop transfer function, which serves to minimize the dynamic tracking error. It is important to observe that the phase detector and D.C. amplifier in the primary phase-locked loop need not be precisely balanced, since the effect of unbalance in this loop will be removed by the action of the phase correction loop. The phase correction loop must, of course, employ a very carefully balanced phase detector and D.C. amplifier. This last result also implies that any desired amount of phase stability can be achieved by the addition of additional phase correction loops similar to the second loop 14.

Figure 3:
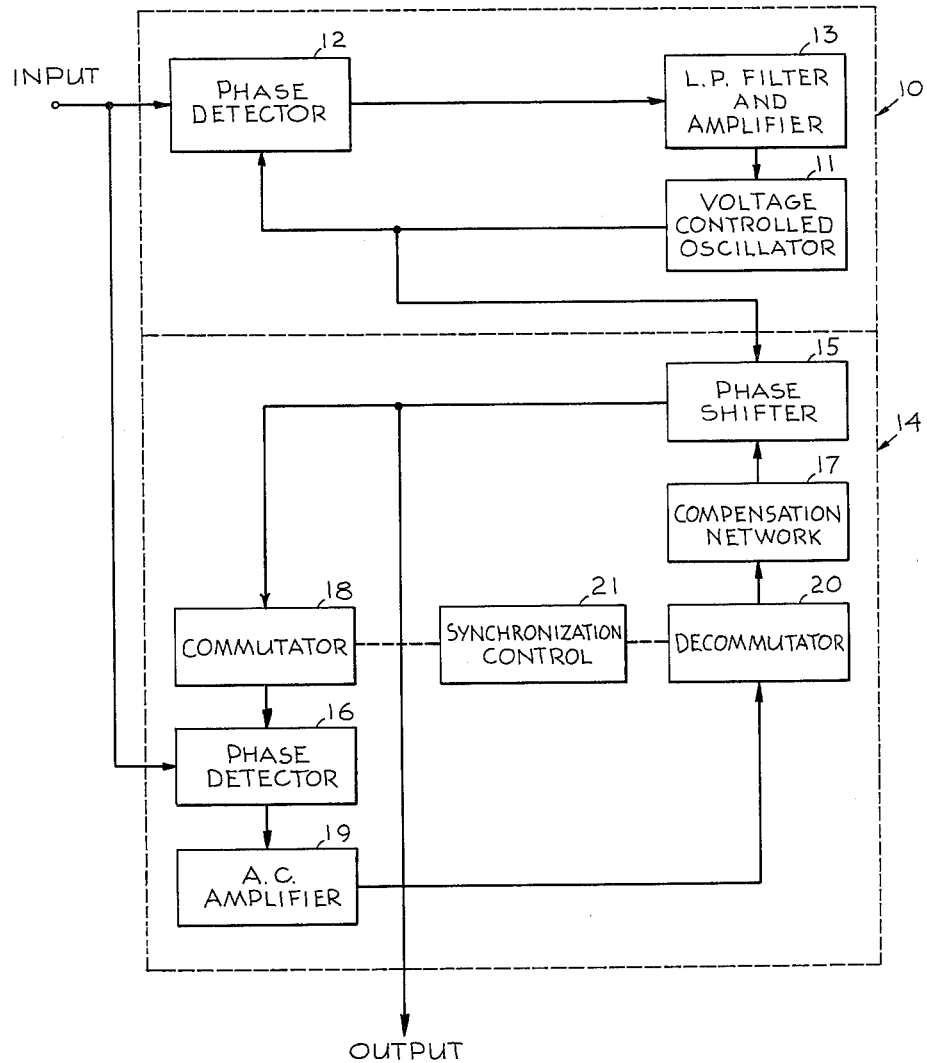
FIG. 3 is a block diagram of a stabilized phase-locked loop using commutation techniques.

Referring now to FIG. 3, there is shown an additional embodiment using a commutated phase detector and an A.C. amplifier in the phase correction loop 14. The first loop 10 is similar in function and implementation to the first frequency determining loop illustrated in FIG. 1. Since the phase correction loop 14 has an extremely narrow bandwidth, typical of the order of a fraction of a cycle per second, it is possible to use a commutation technique having a relatively low commutation frequency to provide precision balancing of the phase detector 16 in the phase correction loop 14. The output of the phase shifter 15 is fed to a multiphase commutator 18 that alternately changes the phase of the signal from the phase shifter 15 first by an amount $\phi_1$ and then by an amount $\phi_2$. The phase commutated input signal is fed to the phase detector 16. As indicated previously, the phase detector 16 compares the commutated signal from VCO 11 with the input signal. The commutated output signal from the phase detector 16 is a varying signal capable of being amplified by an A.C. amplifier 19 before the signal is fed to a multiphase decommutator 20. The gain of the A.C. amplifier reduces the balance requirement on the D.C. stages which follows the decommutator 20 by a factor equal to the A.C. voltage gain. The rate of commutation and decommutation must, of course, be identical and properly phased and is, therefore, controlled by a single synchronization control 21. The commutation and decommutation may be effected in a variety of ways, all of which benefit substantially from the use of a low commutation frequency in order to achieve better balance in the commutation-decommutation operation. The ability of being able to employ a low commutation frequency without disturbing the output phase data will be apparent to those skilled in the art.

Figure 4:
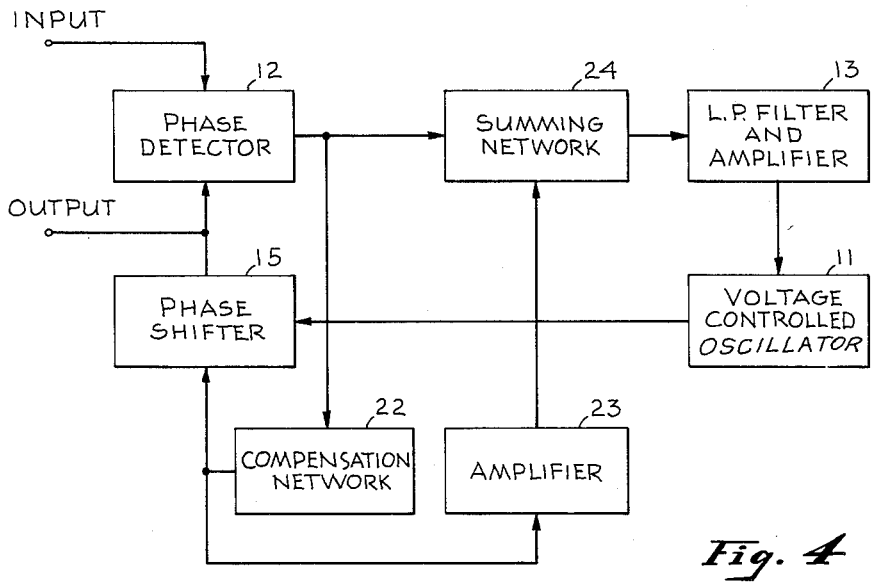
FIG. 4 is a block diagram of a phase-stabilized, phase-locked loop using a single phase detector.

Referring now to FIG. 4, there is shown an additional embodiment of the invention which uses only a single phase detector for reducing dynamic tracking errors. Although the embodiment of FIG. 4 does not lend itself to the use of a low commutation frequency for balancing the phase detector and loop amplifier, the fact that it employs only a single phase detector 12 and corrects the output phase of the VCO 11 directly by means of the phase shifter 15 within the primary loop may be important in certain applications. The modification consists simply of adding a signal proportional to the control voltage for the phase shifter 15, obtained from the output of the compensation network 22, which output is amplified by amplifier 23 and fed to a summing network 24, which also receives an input signal from the phase detector 12 and thereby controls the VCO 11. In this figure, the amplifier 23 has a constant gain factor; however, an amplifier with less than unity gain or an attenuator may be used. The analysis given in connection with FIGS. 4 and 5 shows that the open loop transfer function for the equivalent single loop servo system is given by:

$$KG(s) = K_1 G_1(s) + K_2 G_2(s) + \alpha K_1 K_2 G_1(s) G_2(s)$$

from which it is clear that the performance of this loop is equivalent to that of FIG. 1, when $\alpha = 1$. It is possible to approximate the condition $\alpha = 1$ very closely by careful circuit design. Actually, for some applications it may be advantageous to employ values of $\alpha$ different from unity, since such values may lead to a more desirable overall transfer characteristic.

Figure 5:
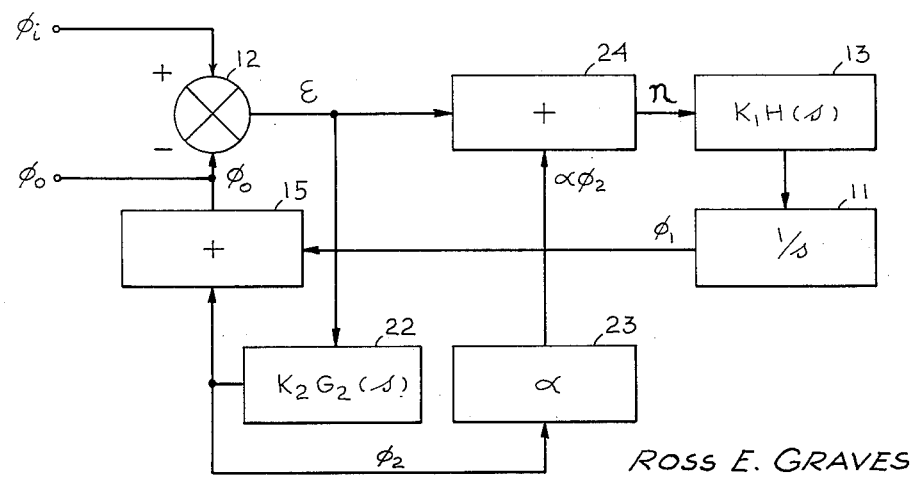
FIG. 5 is a block diagram illustrating the transfer functions of the circuit illustrated in FIG. 4.

Referring now to FIG. 5, there is shown a transfer function block diagram of the circuit illustrated in FIG. 4. The following analysis will show basic similarity between the circuit of FIG. 1 and that illustrated in FIG. 4. A review of FIG. 5 will show that:

(1) $\qquad \eta = \epsilon + \alpha \phi_2$ (2) $\qquad \phi_1 = K_1 G_1 \eta = K_1 G_1 \epsilon + \alpha K_1 G_1 \phi_2$ Since $\phi_2 = K_2 G_2 \epsilon$, this last expression assumes the form, (3) $\qquad \phi_1 = (K_1 G_1 + \alpha K_1 K_2 G_1 G_2) \epsilon$ (4) $\qquad \phi_0 = \phi_1 + \phi_2 = (K_1 G_1 + K_2 G_2 + \alpha K_1 K_2 G_1 G_2) \epsilon$ Since $\epsilon = \phi_i - \phi_0$, this result becomes (5) $\qquad (1 + K_1 G_1 + K_2 G_2 + \alpha K_1 K_2 G_1 G_2) \phi_0$
$\qquad \qquad = (K_1 G_1 + K_2 G_2 + \alpha K_1 K_2 G_1 G_2) \phi_i$ whence (6) $\qquad \phi_0 = \dfrac{K_1 G_1 + K_2 G_2 + \alpha K_1 K_2 G_1 G_2}{1 + K_1 G_1 + K_2 G_2 + \alpha K_1 K_2 G_1 G_2} \phi_i$ and (7) $\qquad \epsilon = \dfrac{1}{1 + K_1 G_1 + K_2 G_2 + \alpha K_1 K_2 G_1 G_2} \phi_i$ With $\alpha = 1$, the Equations 6 and 7 become identical to the equation previously derived for FIG. 1.

This completes the description of the embodiment of the invention illustrated herein. However, many modifications and advantages thereof will be apparent to persons skilled in the art without departing from the spirit and scope of this invention. For example, the spirit and scope of this invention encompass the correction of dynamic lag errors in any servomechanism whose transfer diagram is similar or equivalent to 10 of FIG. 2, and the dynamic lag correction can be effected either by the adjunction of an auxiliary loop 14, as in FIG. 2 or by the modification shown in FIG. 5. The restriction to an electronic phase-locked loop employing a phase detector and a VCO is in no way essential, and the application of the means herein described in more general cases retains the advantages herein described for dynamic lag correction without introduction of the severe loop stability problems which may be encountered if some of the more conventional means are employed. Accordingly, it is desired that this invention not be limited to the particular details of the embodiment disclosed herein, except as defined by the appended claims.

What is claimed is:

1. In combination,
   a phase-locked loop circuit responsive to a frequency varying input signal for generating an output signal having substantially the same instantaneous frequency as said input signal, and
   a phase correction circuit including a phase shifter responsive to said input signal and said output signal for shifting the phase of said output signal by means of said phase shifter an amount substantially equal to the phase error of said first loop.

2. In combination,
   a phase locked loop circuit responsive to a frequency varying input signal for generating an output signal having substantially the same instantaneous frequency as said input signal, and
   a phase correction circuit including a phase shifter responsive to said input signal and said output for shifting the phase of said output signal by means of said phase shifter an amount substantially equal to the phase error of said first loop, said second loop circuit substantially decoupling any instabilities in said first loop from said output signal.

3. In combination,
   a first loop circuit responsive to a frequency varying input signal for generating a first output signal having substantially the same instantaneous frequency as said input signal, and
   a phase-locked loop circuit including a phase shifter responsive to said input signal and said output signal for advancing the phase of said output signal by means of said phase shifter an amount equal to the phase lag error of said first loop.

4. In combination,
   a first loop circuit responsive to a frequency varying input signal for generating a first output signal having substantially the same instantaneous frequency as said input signal, and
   a phase detector, a phase shifter, and a compensation network connected in series to define a second loop circuit, said phase shifter being connected to said first loop circuit for feeding said first output signal to said phase detector, said phase detector generating a signal in proportion to the phase difference between said first output signal fed by said phase shifter and said frequency varying input signal, said compensation network connected to the output of said phase detector for integrating said signal from said phase detector, said phase shifter shifting the phase of said first output signal from said first loop circuit in response to said signal from said compensation network, whereby the signal from said phase shifter to said phase detector varies in phase and frequency as said input signal varies.

5. In combination,
   a voltage controlled oscillator, a first phase detector, and a low pass filter integrator connected in series to define a first loop circuit, said first phase detector generating a signal in proportion to the phase difference between a frequency varying input signal and a signal generated by said voltage controlled oscillator, said low pass filter integrator connected to the output of said first phase detector for integrating said signal generated by said first phase detector, said voltage controlled oscillator being controlled by said integrated signal from said low pass filter integrator for generating an output signal having substantially the same instantaneous frequency as said input signal, and
   a phase shifter, a second phase detector and a compensation network integrator connected in series to define a second loop circuit, said phase shifter being connected to the output of said voltage controlled oscillator for feeding said output signal to said second phase detector, said second phase detector generating a signal in proportion to the phase difference between said frequency varying input signal and said output signal, said compensation network integrator connected to the output of said second phase detector for integrating said signal from said second phase detector, said phase shifter varying the phase of said voltage controlled oscillator signal in response to said integrated signal from said compensation network integrator, whereby the signal from said phase shifter to said second phase detector varies in phase and frequency as said input signal varies.

6. In combination,
a first loop circuit responsive to a frequency varying input signal for generating an output signal having substantially the same instantaneous frequency as said input signal,
a phase correction circuit responsive to said input signal and said output signal for shifting the phase of said output signal an amount equal to the phase error of said first loop, and
commutation and decommutation means in said second loop circuit for removing unbalancing effects in said first loop circuit from said output signal.

7. In combination,
a first loop circuit responsive to a frequency varying input signal for generating an output signal having substantially the same instantaneous frequency as said input signal,
a phase correction circuit responsive to said input signal and said output signal for shifting the phase of said output signal an amount equal to the phase error of said first loop, and
commutation and decommutation means in said second loop circuit for removing unbalancing effects in said first loop circuit from said output signal, said commutation and decommutation means being phase synchronized at a sampling rate that is substantially low with respect to the frequency of said input signal.

8. In combination,
a first loop circuit responsive to a frequency varying input signal for generating an output signal having substantially the same instantaneous frequency as said input signal,
a phase shifter, a phase detector, and a compensation network connected in series to define a second loop circuit, said phase shifter being connected to the output of said first loop circuit for feeding said output signal to said phase detector,
commutation means for commutating the input signal to said phase detector, said phase detector generating a signal in proportion to the phase difference between the commutated output signal and said frequency varying input signal, and
decommutation means for decommutating the output signal from said phase detector at the same sampling rate as said commutation means, said compensation network connected to the output of said decommutator means for integrating said decommutated output signal from said phase detector, said phase shifter varying the phase of said first output signal from said first loop circuit in response to said integrated signal from said compensation network, whereby the signal from said phase shifter to said commutor varies in phase and frequency as said input signal varies.

9. In combination,
a voltage controlled oscillator, a first phase detector, and a low pass filter integrator connected in series to define a first loop circuit, said first phase detector generating a signal in proportion to the phase difference between a frequency varying input signal and a signal generated by said voltage controlled oscillator, said low pass filter integrator connected to the output of said first phase detector for integrating said signal generated by said first phase detector, said voltage controlled oscillator being controlled by said integrated signal for generating an output signal having substantially the same instantaneous frequency as said input signal,
a phase shifter, a second phase detector, and a compensation network connected in series to define a second loop circuit, said phase shifter being connected to the output of said voltage controlled oscillator for feeding said output signal to said second phase detector,
commutation means for commutating the input signal to said second phase detector, said second phase detector generating a signal in proportion to the phase difference between said frequency varying input signal and the commutated output signal,
amplification means for amplifying the commutated output signal from said second phase detector, and
means for decommutating the amplified commutated signal from said amplification means at the same sampling rate as said commutation means, said compensation network connected to the output of said decommutation means for integrating said decommutated output signal from said amplification means, said phase shifter varying the phase of said voltage controlled oscillator signal in response to said integrated signal from said compenation network integrator, whereby the signal from said phase shifter to commutator varies in phase and frequency as said input signal varies.

10. In combination,
a voltage controlled oscillator, a phase shifter, a phase detector, a summing network, and a low pass filter integrator connected in series to define a first loop circuit, said voltage controlled oscillator feeding said phase detector through said phase shifter, said phase detector generating an output signal in proportion to the phase difference between a frequency varying input signal and a phase shifted signal from said voltage controlled oscillator, the output signal from said phase detector being fed to said summing network, said low pass filter integrator being connected to the output of said summing network for integrating the output signal from said summing network, said voltage controlled oscillator being controlled by said integrated signal from said low pass filter integrator for varying the frequency of said voltage controlled oscillator as the frequency of said input signal varies, and
a compensation network integrator, amplifier, and said summing network connected in series to define a second loop circuit, said compensation network integrator being connected to the output of said phase detector and feeding both said phase shifter and said amplifier, said amplifier being connected to said summing network, the output of said phase shifter feeding said phase detector representing the output signal varying in phase and frequency as said input signal varies.

11. In combination,
a first loop circuit responsive to a frequency varying input signal for generating an output signal having substantially the same instantaneous frequency as said input signal,
a phase-locked loop circuit responsive to said input signal and said output signal for shifting the phase of said output signal an amount equal to the phase error of said first loop, and
at least one additional phase-locked loop circuit responsive to said input signal and the output signal from the previous phase-locked loop circuit for improving the phase coherency of said output signal with said input signal.

12. In combination, first means having inherent dynamic lag errors responsive to a variable input signal for generating an output signal having a given relationship to said input signal, and correction means including a phase shifter responsive to said input signal and said output signal for adding a correction to said output signal by means of said phase shifter substantially equal to said inherent dynamic lag in said first means.

References Cited by the Examiner

UNITED STATES PATENTS

| | | | |
|---|---|---|---|
| 2,740,046 | 3/56 | Tellier | 328—155 X |
| 2,956,239 | 10/60 | Hugenholtz | 331—11 X |
| 3,059,187 | 10/62 | Jaffe | 328—155 X |

JOHN W. HUCKERT, *Primary Examiner.*

ARTHUR GAUSS, *Examiner.*